UNITED STATES PATENT OFFICE.

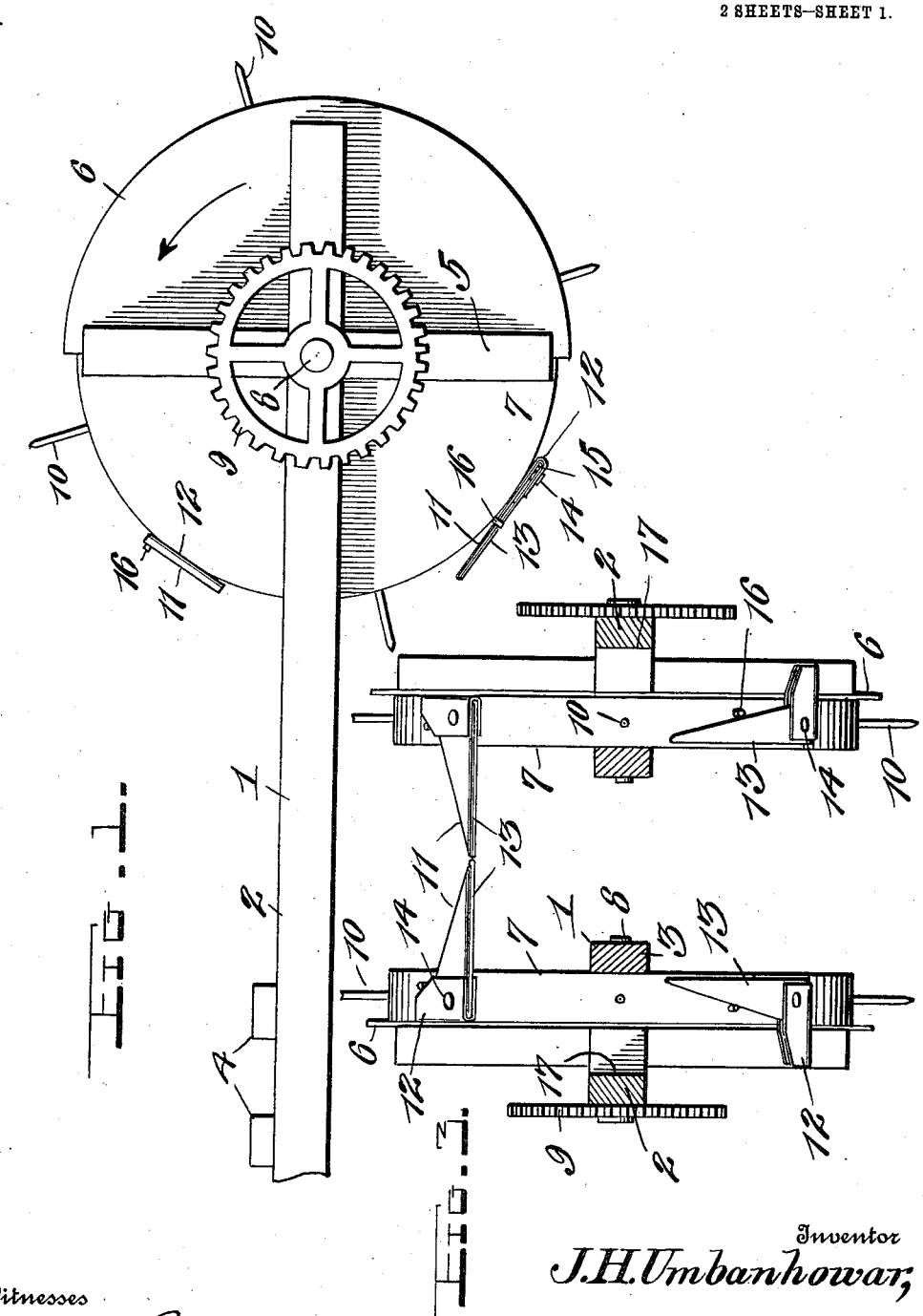

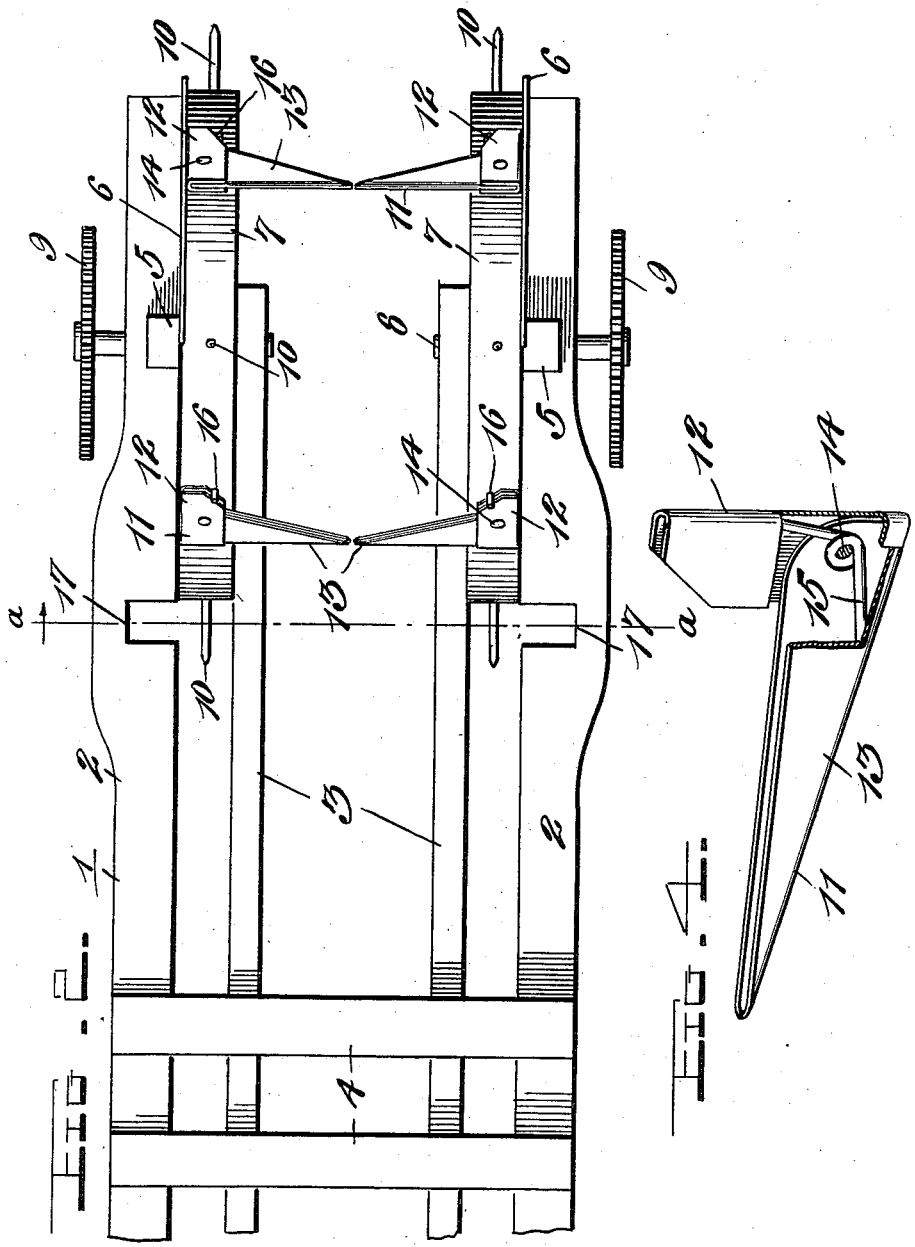

JAMES H. UMBANHOWAR, OF HOMER, ILLINOIS.

CORN-HARVESTER REEL.

1,012,938.  Specification of Letters Patent.  Patented Dec. 26, 1911.

Application filed January 19, 1911. Serial No. 603,531.

*To all whom it may concern:*

Be it known that I, JAMES H. UMBANHOWAR, a citizen of the United States, residing at Homer, in the county of Champaign and State of Illinois, have invented certain new and useful Improvements in Corn-Harvester Reels, of which the following is a specification, reference being had to the accompanying drawings.

This invention is an improved reel for corn harvesters, corn huskers, and other like machines, and consists in the construction, combination and arrangement of devices, hereinafter described and claimed.

The object of my invention is to provide an improved reel of this character which will straighten out tangled corn stalks, lift fallen corn stalks and carry them rearwardly, to the harvesting or husking mechanism, a further object of the invention being to effect improvements in the construction of the reel fingers whereby the same are enabled to yield when they encounter an immovable obstruction and are thereby prevented from being broken.

In the accompanying drawings—Figure 1 is a side elevation of a reel constructed in accordance with my invention. Fig. 2 is a plan of the same. Fig. 3 is a transverse sectional view on the plane indicated by the line *a—a* of Fig. 2. Fig. 4 is a detail perspective view of one of the reel fingers, with parts broken away, and parts in section.

The frame 1 of the reel which extends forwardly from a corn harvesting or other like machine on which the reel is used, may be of any suitable construction. The said frame is here shown as comprising a pair of outer bars 2, and a pair of inner bars 3, which are spaced from the outer bars and are connected thereto by suitable cross bars 4. Other suitable means may be employed for connecting the bars 2, 3, the cross bars 4 being only here shown for the purposes of this specification. Near its front end, each of the outer bars 2 is provided with a cross bar 5, which is at right angles thereto. Semi-circular plates 6 are on the inner sides of the outer bars 2, at the front ends thereof, and are also secured to the cross bars 5. In the space between each outer bar and inner bar, is a circular reel head 7 which is carried by a shaft 8 that has its bearings in said outer and inner bars, each of the said shafts being provided at its outer end with a sprocket wheel 9, or other suitable device whereby the reel heads may be rotated in the direction indicated by the arrow in Fig. 1, so that the upper sides of the reel heads move rearwardly, and their lower sides move forwardly. Each reel head is provided with a suitable number of radial spikes or teeth 10, which serve to straighten out tangled stalks, and to pull the same toward the front of the machine. In the spaces between the spikes 10, are fingers 11. Each of the said fingers comprises an arm 12, and an arm 13. The arms 12 are pivotally mounted on the peripheries of the reel heads, the pivots being indicated at 14, and the said arms swing laterally on the reel heads. The arms 13 swing laterally with the arms 12, and are also pivotally movable independently thereof, being mounted on the same pivots with the arms 12, and being also connected to the said arms by springs 15. The said springs normally dispose the arms 13 at right angles to the arms 12 so as to engage the outer corners of said arms 13, with those of said arms 12, the said corners of the said arms 12 and 13 forming coacting stops to limit the pivotal motion of the arms 13 with reference to the arms 12, the said springs serving to permit the arms 13 to turn pivotally independently of the arms 12 should they strike an obstruction such as a stump or stone and thereby the said reel fingers are prevented from being broken. The peripheries of the reel heads are provided with stop studs 16, which are engaged by the arms 12, and serve to limit the pivotal movement of the said arms 12 in one direction. The outer bars 2 are provided with notches 17 which serve to clear the arms 12 of the reel fingers, and the inner bars 3 are directly in the paths of the arms 13 of the reel fingers.

When the reel is in motion, in the direction of the arrow in Fig. 1, each reel finger, as its arm 13 engages one of the inner bars 3, is turned forwardly so as to dispose its arm 13 parallel with the reel head which carries it, and its arm 12 at right angles to said reel head, and projecting outwardly therefrom, the notches 17 serving to clear the arms 13 of the reel fingers. As each reel finger reaches the lower side of one of the plates 6, its arm 12 is engaged by the said plate, the said plate thereby serving, owing to the motion of the reel finger, with the reel head, which carries it, to turn the reel finger so as to dispose its arm 13 at right angles to the reel head, and its arm 12 parallel therewith. Hence the arms 13 of the reel fingers of the oppositely disposed reel heads extend transversely across the space between the reel heads and serve to engage the stalks of corn, and as the said reel fingers move upwardly and rearwardly over the upper sides of the reel heads, they serve to carry the stalks of corn rearwardly to the harvesting or other machine as will be understood. Should one of the reel fingers strike an obstruction such as a stump, stone, or the like, its arm 13, owing to the provision of the spring, and to the fact that the said arm is pivotally connected to the arm 12, will turn and thereby clear the obstruction and hence the breaking of the reel finger will be avoided. It will be understood that the plates 6 serve as cams, and as guides to turn the reel fingers in one direction, and maintain them in the required position, to dispose their arms 13 across the space between the reel heads, and it will also be understood that the bars 3 will act as tappets to engage the arms 13 of the reel fingers in the reverse direction.

While I have herein shown what I now consider a preferred form of my invention, I would have it understood that minor changes may be made in the form, construction and arrangement of the parts within the scope of the appended claims.

I claim:—

1. A reel head mounted for rotation and provided with radially disposed straightening fingers and also provided with pivotally disposed stalk engaging and carrying fingers mounted on the periphery thereof, the pivotal axes of the said stalk engaging and carrying fingers being radial with respect to the reel head, each of the said stalk engaging and carrying fingers comprising a pair of arms pivotally connected together and a spring to normally dispose said arms at right angles to each other, in combination with relatively fixed devices to respectively engage said arms successively and turn each reel finger first in one direction and then restore it to its original position.

2. A reel head mounted for rotation and having a pivotally mounted reel finger, said reel finger comprising a pair of arms pivotally connected together, and a spring to normally dispose said arms at right angles to each other, in combination with relatively fixed devices to respectively engage said arms of each finger successively, and turn said reel finger first in one direction, and then restore it to its normal position.

3. In combination with a pair of spaced bars, one having a notch on its inner side, a substantially semi-circular cam and guide plate on the inner side of the said notched bar, a reel head mounted for rotation between said bars and at one side of said cam and guide plate, and pivotally mounted reel fingers carried by and peripherally mounted on the said reel head, each of the said reel fingers comprising a pair of pivotally connected arms, and a spring to normally dispose said arms at substantially right angles to each other, one of the bars acting as a tappet to engage an arm of each reel finger successively and turn each reel finger in one direction, the notch of the other bar serving to clear the other arm of each reel finger, the said cam and guide plate serving, by engagement with the last mentioned arm of each reel finger, to restore each reel finger successively to its original position.

4. In combination with a pair of spaced bars, one having a notch on its inner side, a substantially semi-circular cam and guide plate on the inner side of the notched bar, a reel head mounted for rotation between said bars and at one side of the cam and guide plate, reel fingers pivotally mounted on the periphery of the reel head and each having a pair of arms at substantially right angles to each other, the pivotal axis of each reel finger being radial to the reel head and the said reel head being provided with peripherally projecting stop pins to limit the movement of the reel fingers in one direction, one of the said spaced bars serving as a tappet to engage one arm of each reel finger successively and turn the reel finger in one direction, the notch in the other bar serving to clear the other arm of each reel finger successively and the said cam and guide plate serving to engage the last named arm of each reel finger successively and restore each reel finger successively to its original position.

In testimony whereof I hereunto affix my signature in the presence of two witnesses.

JAMES H. UMBANHOWAR.

Witnesses:
 FRED S. UMBANHOWAR,
 MARY S. TAISAL.